United States Patent
Severn et al.

(10) Patent No.: US 9,771,440 B2
(45) Date of Patent: *Sep. 26, 2017

(54) PREPARATION OF ULTRA HIGH MOLECULAR WEIGHT POLYETHYLENE

(71) Applicant: DSM IP ASSETS B.V., Heerlen (NL)

(72) Inventors: John Richard Severn, Echt (NL); Romain Berthoud, Echt (NL); Timothy James Kidd, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/029,871

(22) PCT Filed: Oct. 24, 2014

(86) PCT No.: PCT/EP2014/072837
§ 371 (c)(1),
(2) Date: Apr. 15, 2016

(87) PCT Pub. No.: WO2015/059268
PCT Pub. Date: Apr. 30, 2015

(65) Prior Publication Data
US 2016/0272738 A1    Sep. 22, 2016

(30) Foreign Application Priority Data

Oct. 25, 2013  (EP) .................................. 13190212

(51) Int. Cl.
*C08F 110/02*   (2006.01)
*C08F 10/02*    (2006.01)
*C08F 4/659*    (2006.01)

(52) U.S. Cl.
CPC ............ *C08F 110/02* (2013.01); *C08F 10/02* (2013.01); *C08F 4/65912* (2013.01); *C08F 4/65916* (2013.01); *C08F 2420/03* (2013.01); *C08F 2420/04* (2013.01)

(58) Field of Classification Search
None
See application file for complete search history.

(56) References Cited

U.S. PATENT DOCUMENTS

| | | | |
|---|---|---|---|
| 6,528,671 | B1 | 3/2003 | Nabika |
| 7,528,091 | B2 | 5/2009 | Nakayama et al. |
| 2003/0119661 | A1 | 6/2003 | Gao et al. |
| 2010/0143719 | A1* | 6/2010 | Kidd ...................... C08F 10/00 428/402 |

FOREIGN PATENT DOCUMENTS

| | | |
|---|---|---|
| CN | 102 219 870 | 10/2011 |
| EP | 0 205 960 | 12/1986 |
| EP | 0 890 581 | 1/1999 |
| GB | 2 042 414 | 9/1980 |
| GB | 2 051 667 | 1/1981 |
| WO | WO 01/73173 | 10/2001 |
| WO | WO 2005/090418 | 9/2005 |
| WO | WO 2008/058749 | 5/2008 |
| WO | WO 2009/063084 | 5/2009 |

OTHER PUBLICATIONS

International Search Report for PCT/EP2014/072837, mailed Dec. 23, 2014, 4 pages.
Written Opinion of the ISA for PCT/EP2014/072837, mailed Dec. 23, 2014, 6 pages.
Severn, "Methylaluminoxane (MAO), Silica and a Complex: The "Holy Trinity" of Supported Single-site Catalyst", Tailor-Made Polymers. Via Immobilization of Alpha-Olefin Polymerization Catalysts, WILEY-VCH, Weinheim, chapter 4, 2008, pp. 95-138.
Chadwick, "Catalysts Supported on Magnesium Chloride", Tailor-Made Polymers. Via Immobilization of Alpha-Olefin Polymerization Catalysts, WILEY-VCH, Weinheim, chapter 6, 2008, pp. 151-169.
Severn et al., "Bound but Not Gagged"—Immobilizing Single-Site Alpha-Olefin Polymerization Catalysts, Chemical Reviews, 2005, vol. 105, No. 11, pp. 4073-4147.
Chen et al., "Cocatalysts for Metal-Catalyzed Olefin Polymerization: Activators, Activation Processes, and Structure-Activity Relationships", Chemical Reviews, 2000, vol. 100, No. 4, pp. 1391-1434.
Nakajima, "Advanced Fiber Spinning Technology", Woodhead Publ. Ltd., ISBN 185573 182 7, 1994, 21 pages.
Stephan et al., "An Approach to Catalyst Design: Cyclopentadienyl-Titanium Phosphinimide Complexes in Ethylene Polymerization", Organometallics, 2003, vol. 22, pp. 1937-1947.

* cited by examiner

Primary Examiner — Catherine S Branch
(74) Attorney, Agent, or Firm — Nixon & Vanderhye P.C.

(57) ABSTRACT

The invention relates to a process for the preparation of a particulate ultra high molecular weight polyethylene (UHMWPE), comprising the steps of preparing a magnesium containing carrier, loading the carrier with a organometallic compound forming a supported catalyst and contacting the supported catalyst with at least ethylene under polymerization conditions, wherein the organometallic compound is of the formula $R^3_3P=N-TiCpX_n$.

8 Claims, No Drawings

PREPARATION OF ULTRA HIGH MOLECULAR WEIGHT POLYETHYLENE

This application is the U.S. national phase of International Application No. PCT/EP2014/072837 filed 24 Oct. 2014, which designated the U.S. and claims priority to EP Patent Application No. 13190212.4 filed 25 Oct. 2013, the entire contents of each of which are hereby incorporated by reference.

The invention relates to a method for the preparation of a particulate ultra high molecular weight polyethylene (pUHMWPE). The invention further relates to a pUHMWPE obtainable by said process, to a pUHMWPE and to the use of said pUHMWPE.

A process for the preparation of an UHMWPE is disclosed in WO2009/063084. WO2009/063084 discloses a process for the preparation of ultra high molecular weight polyethylene by preparing a single site catalyst supported by a magnesium containing carrier, said catalyst comprising an organometallic compound and an activator, and polymerizing ethylene in the presence of the single site supported catalyst.

The process disclosed in WO2009/063084 provides UHMWPE polymers with good mechanical properties and process ability. However, the processes described in WO2009/063084 show poor productivity of the catalyst supported by a magnesium containing carrier. Productivity of single site supported catalysts are known to have low productivity especially when compared to the well established Ziegler-Natta systems. Drawbacks of the low productivity provided the process as described in WO2009/063084 may be an economically unviable processes, a particulate UHMWPE with high ash content, high residual titanium content and/or small particle sizes.

U.S. Pat. No. 6,528,671 describes a homogeneous catalyst system for the production of polyolefins comprising phosphinimine transition metal compound, a cocatalyst and optionally an activator. However such homogeneous catalytic polymerization process is subject to fowling problems while the produced polyethylenes are bare of any morphology, rendering their use in commercial processes difficult at best.

EP0890581 describes the production of particulate polyethylene using a phosphinimine cyclopentadienyl metal compound on a silica. The reported productivity of the catalyst system is achieved at the detriment of the particle size and morphology of the polyethylene powder. The non-spherical morphology and high particle size of the polyethylene powder is detrimental for a commercial use in the field of UHMWPE.

Furthermore technology reviews in the field of supported single site catalyst, i.e. organometallic catalyst supported by a carrier, have been published in the last decades. Such reviews are for example reported as chapter 4 and chapter 6 of the book "Tailor-made polymers. Via immobilization of alpha-olefin polymerization catalysts" by John R. Severn and John C. Chadwick, 2008 WILEY-VCH, Weinheim or *Immobilizing single-site alpha-olefin polymerization catalysts* in Chem. Rev. 2005, 105, 4073-4147. These reviews highlight the fact that in the field of polyolefin polymerization, no empirical routes apply and each process and product needs a specific a support/catalyst/cocatalyst combinations.

Therefore, there is a need for a process for preparing pUHMWPE having good balance between UHMWPE process ability and productivity of the employed supported organometallic compound.

It is an objective of the present invention to provide a process for polymerization having a good balance between pUHMWPE process ability and productivity.

Surprisingly, the objective is reached by the process according to the present invention, which will be described in detail below.

In one embodiment of the present invention, there is provided a process for the preparation of particulate UHMWPE with a $MgCl_2$ supported single-site titanium catalysts according to claim 1.

Surprisingly with the process according to the invention a particulate UHMWPE with good process ability is obtained at a good productivity of the employed supported organometallic compound. The particulate UHMWPE shows a narrow molecular weight distribution combined with low ash content and low residual titanium content. A further advantage is that the particulate UHMWPE obtained by the process of the present invention may have an optimized particle size (D50) of between 50 and 200 μm with a narrow particle size distribution (SPAN). This results in particulate UHMWPE that can be beneficial for further processing such as sintering.

In particular the process for preparation of a particulate ultra high molecular weight polyethylene of the present invention comprises the steps of a) preparing a magnesium containing carrier by interaction of a solution of an organomagnesium compound having composition $MgR^1{}_2 \cdot nMgCl_2 \cdot mR^2{}_2O$ where n=0.37-0.7, m=1.1-3.5, $R^1$ is each an aromatic or aliphatic hydrocarbyl residue and $R^2{}_2O$ is an aliphatic ether, with a chlorinating agent at a molar ratio Mg/Cl of at most 0.5, wherein Mg represents the Mg of the organomagnesium compound and Cl the Cl of the chlorinating agent;

b) loading the magnesium containing carrier with a organometallic compound forming a supported catalyst, c) contacting the supported catalyst with at least ethylene under polymerization conditions, wherein the organometallic compound is a compound of the formula $R^3{}_3P=N-TiCpX_n$, wherein each $R^3$ is independently selected from the group consisting of
 a hydrogen atom,
 a halogen atom,
 a $C_{1-20}$ hydrocarbyl radicals optionally substituted by at least one halogen atom,
 a $C_{1-8}$ alkoxy radical,
 a $C_{6-10}$ aryl or aryloxy radical,
 an amido radical,
 a silyl radical of the formula $-Si-(R^4)_3$
 and a germanyl radical of the formula $-Ge-(R^4)_3$ wherein each $R^3$ is independently selected from the group consisting of hydrogen, a $C_{1-8}$ alkyl or alkoxy radical, $C_{6-10}$ aryl or aryloxy radicals, Cp is a cyclopentadienyl ligand;

X is an activatable ligand and n is 1 or 2, depending upon the valence of Ti and the valence of X, preferably, X is selected from the group consisting of Cl, Br, Me and Et if n=2 or X is a substituted or unsubstituted butadiene if n=1.

By activatable ligand in the context of the present invention is referred to a ligand which may be activated by a cocatalyst or "activator" (e.g. an aluminoxane) to facilitate olefin polymerization. Activatable ligands may independently be selected from the group consisting of a hydrogen atom, a halogen atom, a $C_{1-10}$ hydrocarbyl radical, a $C_{1-10}$ alkoxy radical, a $C_{5-10}$ aryl oxide radical and; each of which said hydrocarbyl, alkoxy, and aryl oxide radicals may be unsubstituted by or further substituted by a halogen atom, a $C_{1-8}$ alkyl radical, silyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphide radical which is unsubstituted or substituted by up to two $C_{1-8}$ alkyl radicals. The preferred catalysts contain a Ti atom in the highest oxidation state (i.e. 4+). Thus, the preferred catalyst contains two activatable ligands. In some instances, the metal of the catalyst component may not be in the highest oxidation state. For example, a titanium (III) component would contain only one activatable ligand.

Two X ligands may also be joined to one another and form for example a substituted or unsubstituted diene ligand (i.e. 1,3-diene); or a delocalized heteroatom containing group such as an actetate or acetamidinate group.

In a convenient embodiment of the invention, each X is independently selected from the group consisting of a halide atom, an alkyl radical and a benzyl radical The preparation of the magnesium containing carrier is preferably carried out at a temperature in the range from 5 to 80° C. The preparation is typically carried out in dry aprotic, hydrocarbon solvent.

The chlorinating agent can be any type of chlorinated compound able to provide at least one chlorine to the organomagnesium compound, preferably compounds with covalently bound chlorine such as chlorinated aliphatic or aromatic hydrocarbons. Preferably the chlorinating agent is a chlorine-containing compound of composition $Y_kACl_{4-k}$, where Y=$OR^5$ or $R^5$ group with $R^5$ being a $C_{1-20}$ hydrocarbyl radicals optionally substituted by at least one halogen atom, A being Si or C atom and k=0 to 2. Preferably the chlorinating agent is a hydrocarbyl halide silane with A=Si, k=1 or 2 or phenyl trichloro methane. Magnesium containing carriers produced by said preferred chlorinating agents have the advantage of being obtained in higher yield or deliver supported catalysts with tunable average particle size, particle size distribution, and further increased productivity.

The organomagnesium compound $MgR^1_2 \cdot nMgCl_2 \cdot mR^2_2O$ may have a broad molecular composition defined by the ranges of n=0.37-0.7 and m=1.1-3.5. It will be obvious to the skilled person that said compounds will have complex structures allowing for the decimal nature of n and m. Preferably n=0.4-0.65, more preferably 0.45 to 0.6 and m is preferably 1.5-2.5, more preferably 1.8-2.1 and most preferably m=2. Each $R^1$ is an aromatic or aliphatic hydrocarbyl residue. Preferably $R^1$ is and aryl group (Ar), wherein the aryl group preferably comprises an aromatic structure with 6 to 10 carbon atoms. Optionally the aromatic structure is substituted by at least one $C_1$ to $C_8$ alkyl group. Aliphatic $R^1$ residues may be selected from linear or branched alkyl residues with 1 to 10 carbon atoms such as methyl, ethyl, n-propyl, i-propyl, n-butyl, i-butyl or t-butyl. $R^2_2O$ is an aliphatic ether. By aliphatic ether is understood that $R^1$ is a hydrocarbyl residue bound to the oxygen ether atom via an aliphatic carbon atom. Preferably $R^2$ is R=i-Am, n-Bu.

In a preferred embodiment, the molar ratio of Mg of the organomagnesium compound to Cl of the chlorinating agent in the preparation of the magnesium containing carrier is at most 0.4, more preferably at most 0.3. The molar ratio is not particularly limited but for practical reasons the ratio may be at least 0.01, more preferably at least 0.02 and most preferably at least 0.05.

By the process of the invention, a magnesium containing carrier is obtained after step a). Said intermediate magnesium containing carrier may be isolated and stored for later use or subjected immediately to the further steps of the process. Preferably, the magnesium containing carrier has particle size, expressed as D50, from 2 to 30 µm. By D50 is understood in the present application the median particle size diameter. Preferably the D50 is at least 2 micron, more preferably at least 3 micron and most preferably at least 5 micron. A D50 of the magnesium containing carrier within the preferred ranges may provide an optimum handling of the obtained particulate UHMWPE in commercial equipment. The magnesium containing carrier preferably has a narrow particle size distribution (SPAN) from 0 to 10, more preferably from 0.1 to 5, even more preferably from 0.3 to 2 and most preferably from 0.4 to 1. In a further preferred embodiment, the particle size distribution is at most 5, preferably at most 2 and most preferably at most 1, bearing in mind that a monomodal particle size distribution has the value of 0.

A supported catalyst is prepared by loading the magnesium containing carrier with a organometallic compound. This is generally performed by treatment of a suspension of the magnesium containing carrier with a solution of the organometallic compound in a hydrocarbon solvent. The molar ratio of the organometallic compound to Mg may be from 0.001 to 1, preferably from 0.005 to 0.5 and most preferably from 0.01-0.1. The loading of the magnesium containing carrier is preferably carried out at a temperatures between 20° C. and 100° C. Preferably the magnesium containing carrier is suspended in the solvent used for the preparation of said carrier in step a) and may further contain residues from the carrier preparation step. In a preferred embodiment, reagents from the synthesis are removed from the carrier by for example washing and filtration with suitable solvents before the carrier is isolated as a powder or brought again into a suspension. The solvent of the suspension and the solvent of the organometallic compound may be the same or different. Suitable solvents for the suspension and/or solution of the organometallic compound are aliphatic and aromatic hydrocarbons, preferably with a boiling point between 20° C. and 200° C. Preferably the solvents are individually selected from the list consisting of pentane, hexane, heptane, isoparafine mixture, toluene and xylene as well as their isomers.

The organometallic compound is of the general formula $R^3_3P=N-TiCpX_n$, wherein each $R^3$ is independently selected from the group consisting of a hydrogen atom, a halogen atom, a $C_{1-20}$ hydrocarbyl radicals optionally substituted by at least one halogen atom, a $C_{1-8}$ alkoxy radical, a $C_{6-10}$ aryl or aryloxy radical, an amido radical, a silyl radical of the formula $-Si-(R^4)_3$ and a germanyl radical of the formula $-Ge-(R^4)_3$ wherein each $R^3$ is independently selected from the group consisting of hydrogen, a $C_{1-8}$ alkyl or alkoxy radical, $C_{6-10}$ aryl or aryloxy radicals, Cp is a cyclopentadienyl ligand; X is an activatable ligand and n is 1 or 2, depending upon the valence of Ti and the valence of X, preferably, X is selected from the group consisting of Cl, Br, Me and Et if n=2 or X is a substituted or unsubstituted butadiene if n=1.

The preferred phosphinimine ligand ($R^3_3P=N-$) are those in which each $R^3$ is a hydrocarbyl radical. A particularly preferred phosphinimine ligand is tri-(tertiary butyl) phosphinimine (i.e. where each $R^3$ is a tertiary butyl group).

As used herein, the term cyclopentadienyl ligand is meant to broadly convey its conventional meaning, namely a ligand having a five carbon ring which is bonded to the metal via eta-5 bonding. Thus, the term "cyclopentadienyl" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —Si—$(R^4)_3$ and a germanyl radical of the formula —Ge—$(R^4)_3$ wherein each $R^4$ is independently selected from the group consisting of hydrogen, a $C_{1-8}$ alkyl or alkoxy radical, $C_{6-10}$ aryl or aryloxy radicals. Preferably Cp is unsubstituted cyclopentadienyl or pentamethylcyclopentadienyl.

In a most preferred embodiment of the process of the invention the organometallic compound is of the formula $^tBu_3P=N—TiCp^*X_2$, wherein $Cp^*$ is pentamethylcyclopentadienyl and X is selected from the group consisting of Cl, Br, Me and Et. It was found that the supported catalyst prepared with such organometallic compound may results in higher productivity of particulate UHMWPE.

In a further preferred embodiment, the process of the invention comprises the step of treating the magnesium containing carrier, the organometallic compound and/or the supported catalyst with an activator selected from the list of alumoxanes, alkyl aluminums, alkyl aluminum halides, anionic compounds of boron or aluminum, boranes such as trialkylboron and triarylboron compounds, borates, and mixtures thereof, preferably the activator is alumoxanes or alkyl aluminums. Well known boranes and borates used as activator in the preparation of polyolefins are described in *Chem. Rev.*, 2000, 100, 1391 by E. Y-X. Chen and T. J. Marks which is herein included by reference. By such treatment even higher yields of particulate UHMWPE may be obtained.

The alumoxane may be of the overall formula: $(R^5)_2AlO(R^5AlO)_pAl(R^5)_2$ wherein each $R^5$ is independently selected from the group consisting of $C_{1-20}$ hydrocarbyl radicals and p is from 0 to 50, preferably $R^5$ is a $C_{1-4}$ radical and p is from 5 to 30. Methylalumoxane (or "MAO") in which most of the R groups in the compounds of the mixture are methyl is the preferred alumoxane. Alumoxanes are also readily available articles of commerce generally as a solution in a hydrocarbon solvent.

The alumoxane, when employed, is preferably added at an aluminum to titanium mole ratio of from 20:1 to 1000:1. Preferred ratios are from 50:1 to 250:1.

In the context of the present invention alkyl aluminums and alkyl aluminum halides are represented by the general formula $AlR^6_qX_r$, wherein Al is an aluminium atom in the trivalent valence state, each $R^6$ is an alkyl residue, X is a halogen atom, q and r are natural numbers of 1-3 with the provision that q+r=3. Typical examples are trialkyl aluminum such as triethyl aluminum, triisobutylaluminum, trihexyl aluminum and trioctyl aluminum; dialkyl aluminum hydrides such as diethyl aluminum hydride and diisobutyl aluminum hydride; dialkyl aluminum halides such as diethyl aluminum chloride; mixtures of a trialkyl aluminum and a dialkyl aluminum halide such as a mixture of triethyl aluminum and diethyl aluminum chloride.

In the context of the application, trialkylboron compounds and triarylboron compounds are boranes represented by the general formula $BR^7_3$, wherein B is a boron atom in the trivalent valence state and each $R^7$ is respectively an alkyl or aryl residue. Preferably the alkyl or aryl residues are substituted with at least on halogen atom. A most preferred triaryl boron compound is tris pentafluorophenyl borane.

In the context of the present application borates are boron containing compounds of the formula $[R^8]^+[B(R^9)_4]^-$ wherein B is a boron atom, $R^8$ is a cyclic $C_{5-7}$ aromatic cation or a triphenyl methyl cation and each $R^9$ is independently selected from the group consisting of phenyl radicals which are unsubstituted or substituted with from 1 to 5 substituents selected from the group consisting of a fluorine atom, a $C_{1-4}$ alkyl or alkoxy radical which is unsubstituted or substituted by fluorine atoms; and a silyl radical of the formula —Si—$(R^{10})_3$; wherein each $R^{10}$ is independently selected from the group consisting of a hydrogen atom and a $C_{1-4}$ alkyl radical.

In step c) of the process of the present invention the supported catalyst is contacted with at least ethylene under polymerization conditions.

The polymerization may be carried out under various conditions such as at temperatures between 20° C. and 100° C. in the presence of an inert hydrocarbon solvent, such as a $C_{5-12}$ hydrocarbon which may be unsubstituted or substituted by a $C_{1-4}$ alkyl group such as pentane, methyl pentane, hexane, heptane, toluene, octane, cyclohexane, methylcyclohexane, pentamethylheptane and hydrogenated naphtha or under gas phase conditions without a hydrocarbon diluent at temperatures from 20 to 160° C., preferably from 40° C. to 100° C. Low temperatures may result in a decreased polymerization activity, whereas high temperatures may result in degradation of the catalyst system, lowering of the molecular weight and/or a loss of the particulate morphology of the UHMWPE due to a loss of cohesion of the produced UHMWPE. The polymer molecular weight may be regulated by the use of chain transfer agents and/or hydrogen. A polymerization pressure is not particularly limited, and a pressure of usually ambient pressure to about 10 MPa, preferably about 50 kPa to 5 MPa and most preferably from about 100 kPa and 1.5 MPa is adopted, from the industrial and economic viewpoints. As a polymerization type, either a batch type or a continuous type can be employed. Preferably slurry polymerization using an inert hydrocarbon solvent such as propane, butane, isobutane, pentane, hexane, heptane and octane, or gaseous polymerization can be employed. Generally the reactors should be operated under conditions to achieve a thorough mixing of the reactants. Preferably a batch process is used with the advantage that particle size distribution as well as, molecular weight distribution and monomer feeds may be advantageously controlled.

The monomers used in the process according to the invention for the preparation of the particulate UHMWPE may be dissolved/dispersed in the solvent either prior to being fed to the reactor or for gaseous monomers the monomer may be fed to the reactor so that it will dissolve in the reaction mixture. Prior to mixing, the solvent and monomers are preferably purified to remove potential catalyst poisons such as water or oxygen. The feedstock purification follows standard practices in the art, e.g. molecular sieves, alumina beds and oxygen and CO(S) removal catalysts are used for the purification of monomers. The solvent itself as well is preferably treated in a similar manner.

The feedstock may be heated or cooled prior to feeding to the polymerization and the reaction may be heated or cooled by external means.

Generally, the catalyst components may be added as a separate suspension to the reactor or premixed before adding to the reactor.

After the polymerization, polymerization can be stopped by adding a polymerization terminator such as alcohols, water, oxygen, carbon monoxide or carbon dioxide, removing the monomers, or stopping the addition of the monomers.

In a yet preferred embodiment of the invention in step c) ethylene and at least one olefinic co-monomer, preferably an alpha-olefin is contacted with the supported catalyst. In the context of the present invention an alpha-olefin refers to an alpha-olefin having 3 or more carbon atoms, preferably from 3 to 20 carbon atoms. Preferred alpha-olefins include linear mono-olefins such as propylene, butene-1, pentene-1, hexene-1, heptene-1, octene-1 and decene-1; branched mono-olefins such as 3-methyl butene-1,3-methyl pentene-1 and 4-methyl pentene-1; vinyl cyclohexane, and the like. These alpha-olefins may be used alone, or in a combination of two or more. In addition, a small amount of a compound having multiple unsaturated bonds such as conjugated diene or non-conjugated diene may be added during the copolymerization.

The invention also relates to the ultrahigh molecular weight polyethylene obtainable by the process according to the invention.

The particulate UHMWPE that may be obtained by the process of the present invention has good process ability while being polymerized with a good productivity of the employed supported organometallic compound. Hereby, for the first time according to the knowledge of the inventors, a particulate UHMWPE has been provided with an optimized combination of process ability and UHMWPE characteristics such as molecular weight distribution, particles size and catalyst residues. Optionally particle size distribution and particle morphology may be optimized.

Hence the present application also relates to a particulate ultra high molecular weight polyethylene (pUHMWPE) having an intrinsic viscosity (IV) of at least 4 dl/g, a molecular weight distribution Mw/Mn of less than 4, a median particle size D50 of between 50 and 200 μm, a residual Ti-content of less than 10 ppm, a residual Si-content of less than 50 ppm, and a total ash content of less than 1000 ppm. Preferably the Si-content of the pUHMWPE according to the invention is less than 40, more preferably less than 30, even more preferably less than 25, even more preferably less than 20 and most preferably less than 10 ppm.

The ultra-high molar weight polyethylene according to the invention has an intrinsic viscosity (IV, as measured on solution in decalin at 135° C.) of at least about 4 dl/g, preferably at least about 8, more preferably at least about 12 dl/g, to provide articles comprising the pUHMWPE with optimal mechanical properties. The pUHMWPE according to the invention may have an IV of at most 50 dl/g, preferably at most 40 dl/g. Intrinsic viscosity is a measure for molecular weight (also called molar mass) that can more easily be determined than actual molecular weight parameters like $M_n$ and $M_w$. There are several empirical relations between IV and Mw. Based on the equation $M_w=5.37*10^4 [IV]^{1.37}$ (see EP 0504954 A1) an IV of 4 or 8 dl/g would be equivalent to $M_w$ of about 360 or 930 kg/mol, respectively. When the intrinsic viscosity is too small, the strength necessary for using various molded articles from the ultra-high molecular weight polyethylene sometimes cannot be obtained, and when it is too large, the process ability, etc. upon molding is sometimes worsen.

The pUHMWPE according to the invention has a molecular weight distribution Mw/Mn of less than 4.0, preferably less than 3.5, preferably less than 3 and even most preferably less than 2.8. Such preferred pUHMWPE may demonstrate optimized mechanical properties. By molecular weight distribution (MWD) in the context of the present application is understood the ratio of Mw/Mn. Since there may be conflicting teachings in the literature about the way to measure $M_w$ and/or $M_n$ values for a particular UHMWPE, resulting in a discrepancy of the MWD, the herein understood MWD is the one as measured by SEC technique as further described in the experimental section. The MWD of the particulate UHMWPE according to the invention has no particularly low limit. The theoretical limit is the one of a monodisperse polymer with an MWD of 1, preferably the MWD is at least 1.1.

Preferably, the UHMWPE is a linear polyethylene with less than one long chain branch (LCB) per 100 total carbon atoms, and preferably less than one LCB per 300 carbon atoms; an LCB is herein defined as a branch containing at least 20 carbon atoms.

The particulate UHMWPE of the invention has a median particle diameter (D50) from 50 to 200 micron. It is preferably from 60 to 180 micron, more preferably from 65 to 150 micron. Too low particle sizes lead to dust and safety issues in the process whereas too high particle sizes may negatively impact the process ability of the pUHMWPE by for example by uneven sintering.

In a further preferred embodiment, the particulate UHMWPE of the invention has a particle size distribution parameter (SPAN) of at most 3, preferably at most 2.5 and even more preferably at most 2 and most preferably at most 1. The SPAN is expressed by the equation SPAN=(D90−D10)/D50 wherein D90, D10 and D50 are particle sizes at 90%, 10% and 50% in a volume cumulative distribution, respectively, while D50 is also referred to as the median diameter. The smaller the value is, the narrower the particle size distribution is.

The morphology of the particulate UHMWPE of the invention may be influenced by the magnesium containing carrier prepared during the process of the invention. It was observed that the supported catalyst may yield pUHMWPE of substantially spheroidal shape. By substantially spheroidal shape in the context of the present invention is meant that the largest diameter of an individual UHMWPE particle is at most 1.5 times the average diameter of said particle, preferably at most 1.4 times the average diameter and most preferably at most 1.2 times the average diameter of said particle. By largest diameter of a particle is understood the diameter of the smallest possible sphere that would circumscribe the entire particle. By average diameter of a particle is understood the diameter of the sphere that can comprise the mass of the concerned particle. Such spheroidal morphology stands for example in contrast to oblong or granular particles or particles of irregular shape as often obtained from most of oxide-based carriers such as silica carriers. Spheroidal morphology of the pUHMWPE particles provides products with good powder bulk density.

The particulate UHMWPE of the invention is further characterized by a residual Ti-content of less than 10 ppm, preferably less than 7 ppm, more preferably less than 5 ppm and most preferably less than 2 ppm. Lower residual Ti levels are a result of an increased productivity of the supported catalyst and may allow pUHMWPE with an increased stability.

In one preferred embodiment, the level of any residual active catalyst metal is less than 10 ppm, preferably less than 8 ppm, more preferably less than 7 ppm and most preferably less than 5 ppm. In a yet preferred embodiment, the combined level of residual active catalyst metals is less than 25 ppm, preferably less than 20 ppm, more preferably less than 15 ppm and most preferably less than 10 ppm. By active catalyst metal is herein understood metals that are commonly used for the production of polyolefins, especially the metals of groups 4 to 7 of the periodic table of elements, more especially the metals of group 4, i.e. Ti, Zr and Hf. The respective levels of Ti, Zr, and/or Hf are measured by Neutron Activation Analysis (NAA).

The particulate UHMWPE of the invention is further characterized by a residual ash content of less than 1000 ppm, preferably less than 600 ppm, more preferably less than 300 ppm and most preferably less than 100 ppm. Lower residual ash levels are a further result of an increased productivity of the supported catalyst and may provide pUHMWPE having improved color neutrality. The residual ash content of the particulate UHMWPE is calculated based on the amount of supported catalyst in mg and the respective polyethylene yield of said catalyst in kg during the polymerization. The skilled person will be aware that residual ash content can also be approximated by the sum of the elements identified by Neutron Activation Analysis (NAA) or X-ray fluorescence (XRF) or other analytical means available in the art.

The particulate UHMWPE may be prepared by a catalyst supported by a magnesium containing carrier as described above. Such carrier as well as therefrom prepared UHMWPE is substantially free of silica, though small amounts of silicon may be present in the pUHMWPE depending upon the used chlorinating agent. Hence the pUHMWPE of the present invention has a residual Si-content of less than 50 ppm, preferably less than 40 ppm, more preferably less than 30 ppm and most preferably of less than 20 ppm. The residual Si-content of the particulate UHMWPE is calculated based on the amount of Silicium (in mg) present in the supported catalyst and the respective polyethylene yield of said catalyst in kg during the polymerization. As above, NAA and XRF are suitable method to confirm residual Si levels.

In a yet further preferred embodiment, the pUHMWPE of the invention has an apparent bulk density of at least 300 kg/m$^3$. It is preferably from 350 to 550 kg/m$^3$, more preferably from 380 to 530 kg/m$^3$, further more preferably from 390 to 520 kg/m$^3$. It was found that pUHMWPE with bulk densities in the mentioned ranges may provide good handling characteristics.

The particulate ultrahigh molecular weight polyethylene of the present invention is eminently suitable for the manufacture of molded articles such as tapes, films and fibers. Accordingly, the present invention also pertains to a process for manufacturing of molded UHMWPE articles, preferably tapes, films and fibers from the pUHMWPE of the invention.

A suitable method for producing a molded article from the pUHMWPE according to the invention is a gel spinning process as described in for example GB-A-2042414, GB-A-2051667, EP 0205960 A and WO 01/73173 A1, and in "Advanced Fibre Spinning Technology", Ed. T. Nakajima, Woodhead Publ. Ltd (1994), ISBN 185573 182 7. In short, the gel spinning process comprises preparing a solution of a polymer of high intrinsic viscosity, extruding the solution into a tape, film of fiber at a temperature above the dissolving temperature, cooling down the tape, film of fiber below the gelling temperature, thereby at least partly gelling the tape, film or fiber, and drawing the film, tape or fiber before, during and/or after at least partial removal of the solvent.

The present application also pertains to products which contain a molded article of the invention, such as ropes, cables, nets, fabrics, and protective appliances such as ballistic resistant articles.

The present invention will be elucidated by the following examples, without being limited thereto or thereby.

EXPERIMENTAL

The organometallic compound Cp*Ti[(t-Bu)$_3$PN]Cl$_2$ (I) was produced according to the method described in Douglas W. Stephan et al in *Organometallics*, 2003, 22, 1937-1947, which is hereby included by reference.

Preparation of Magnesium Containing Carrier and Supported Catalyst.

Example 1: Preparation of the Magnesium Containing Carrier

In a 1 L reactor equipped a thermostat, internal temperature control and a mechanical stirrer. 130 mL of PhMgCl in dibutylether (0.53 mol Mg/L) was stirred at 500 rpm at 10° C. 75 mL of a 3.7 M solution of PhSiCl$_3$ in PhCl was added drop wise at a rate of 75 ml/hour. The reaction mixture was stirred for 30 minutes at 10° C., then heated at a rate of 1° C./min to 60° C., and finally stirred for a further 30 minutes at 60° C. Heptane washings were then performed until the supernatant is clean. The support obtained has a median particle size 10.2 μm of and a span of 0.96 as measured by Malvern Laser light scattering.

Example 2: Pre-Treatment of the Magnesium Containing Carrier by an Alkyl Aluminum Compound A toluene suspension of the MgCl$_2$ support from Example 1 and MAO$_{10\% \, wt}$ (0.138 mol in toluene) was stirred at 300 rpm and 60° C. for 1 hour. The resulting solid was washed thoroughly with toluene at 60° C. until the supernatant is clean.

Example 3: Supporting of the Organometallic Compound

In a 1 L reactor, ~5 g of solid from Example 2 in toluene is stirred at 300 rpm and at room temperature. 40 mL of 0.02 M toluene solution of compound (I) is added and the mixture is allowed to react for 1 hour. Toluene washings are then performed until the supernatant is colorless. The solid is finally slurried in 250 mL of heptane.

Example 4

In a 100 mL reactor, ~250 mg of solid from Example 2 in toluene is contacted at room temperature with 20 mL of 0.015 M toluene solution of compound (I) for 1 hour. Toluene washings are then performed until the supernatant is colorless. The solid is finally slurried in 2 mL of heptane.

Example 5

Supported catalyst is prepared as described in example 3 from a support with a d50 of 5.5 μm obtained by the process of example 1 at a higher stirring rate.

Example 6

Supported catalyst is prepared as described in example 3 from a support with a d50 of 3.2 μm.

Example 7: Preparation of the Magnesium Containing Carrier

The process of Example 1 is repeated with the difference that the PhMgCl was at a molar rate of 1.0 mol Mg/L. The support obtained has a median particle size 6.5 μm of and a span of 0.92 as measured by Malvern Laser light scattering.

Example 8

A supported catalyst is prepared as described in Example 3 from a support prepared as described in Example 9.

Example 9

A supported catalyst is prepared as described in Example 3 from a support with a d50 of 11.9 μm obtained by the process of Example 9 whereby the stirring rate is 250 rpm.

Example 10

Supported catalyst is prepared as described in Example 3 from a support with a d50<2 μm obtained by the process of Example 9 whereby the stirring rate is 1400 rpm.

Comparative Experiment A:

Catalyst prepared as described in example 4 except that the solution of compound (I) is replace by 20 mL of a 0.0125 M toluene solution of CpTiCl$_3$.

Comparative Experiment B:

Catalyst prepared as described in example 4 except that the solution of compound (I) is replace by 20 mL of a 0.015 M toluene solution of Me$_5$CpTiCl$_2$(NC(2,6-F$_2$Ph)($^i$Pr$_2$N) prepared as described in WO2005/090418.

Comparative Experiment C:

A MgCl$_2$ support is prepared as described in example 18 of U.S. Pat. No. 7,528,091B2. The resulting d50 was 12.5 μm. 250 mg of the resulting solid in toluene is contacted at room temperature with 20 mL of 0.015 M toluene solution of compound (I) for 1 hour. Toluene washings are then performed until the supernatant is colorless. The solid is finally slurried in heptane.

Comparative Experiment D:

A MgCl$_2$ support prepared as described in Example 1 slurried in heptane is contacted at 60° C. with 0.09 mol TiCl$_4$ for 1 h. Heptane washings were then performed until the supernatant is clean.

General Polymerization Procedure:

Unless otherwise specified, batch polymerizations were carried out in a stirred 2 L or 10 L reactor. The reaction temperature was set to the required temperature and controlled by a Lauda thermostat. The feed streams (solvent and ethylene) were purified with various adsorption media to remove catalyst killing impurities such as water, oxygen and polar compounds as is known by someone skilled in the art. In an inert atmosphere the previously dried reactor is filled with 1 L of heptane (or 4.5 L for Experiments IV and VI). After the solvent has reached the desired temperature, the scavenger components are added and after 5 minutes the supported catalyst is added. Next the ethylene stream is fed into the reactor to reach and maintain a total pressure of 0.5 or 1.0 MPa. After the desired polymerization time, the contents of the reactor is collected, filtered and dried under vacuum at 50° C. for at least 12 hours. The polymer is weighted and samples are analyzed.

| Polymerization Reaction | Catalyst | Cat [mg] | Scavenger TEA [mmol/L] | Temperature [° C.] | Pressure [MPa] | Reaction Time [h:m] | Yield [g] | Cat Yield [gpol/gcat] | Productivity [gpol/gcat*h*barg] | D50 [μm] |
|---|---|---|---|---|---|---|---|---|---|---|
| A | C.Exp. A | 250 | 1.00 | 60 | 0.5 | 2:04 | 196 | 787 | 76 | 105.9 |
| B | C.Exp. B | 250 | 1.00 | 60 | 0.5 | 2:00 | 35 | 140 | 14 | |
| C | C.Exp. C | 250 | 1.00 | 60 | 0.5 | 2:00 | 55 | 220 | 22 | 618.0 |
| D | C.Exp. D | 15 | 0.92 | 60 | 0.5 | 2:00 | 98 | 6528 | 653 | 171.9 |
| I | Ex. 3 | 100 | 1.00 | 60 | 0.5 | 2:00 | 259 | 2589 | 259 | 165.4 |
| II | Ex. 4 | 250 | 1.00 | 60 | 0.5 | 1:34 | 358 | 1437 | 184 | 129.2 |
| III | Ex. 5 | 100 | 0.92 | 60 | 0.5 | 2:00 | 301 | 3009 | 301 | 89.2 |
| IV | Ex. 5 | 110 | 4.6 | 70 | 1.0 | 3:53 | 1720 | 15686 | | 145.1 |
| V | Ex. 6 | 15 | 0.92 | 60 | 0.5 | 1:00 | 266 | 17686 | 3537 | 57.6 |
| VI | Ex. 6 | 50 | 4.6 | 60 | 0.5 | 7:00 | 1325 | 26225 | | 93.5 |
| VII | Ex. 8 | 15 | 0.92 | 60 | 0.5 | 2:00 | 147 | 9737 | 974 | 101.6 |
| VIII | Ex. 9 | 15 | 0.92 | 60 | 0.5 | 2:00 | 79 | 5204 | 520 | 166.4 |
| IX | Ex. 10 | 15 | 0.92 | 60 | 0.5 | 2:00 | 340 | 22603 | 2260 | 41.5 |

| Polymerization Reaction | SPAN | Bulk density [g/L] | Ti content [ppm] | Calculated Ash Content [ppm] | DF [s] | ES [N/mm$^2$] | IV [dL/g] | Mn [kg/mol] | Mw [kg/mol] | Mw/Mn [—] |
|---|---|---|---|---|---|---|---|---|---|---|
| A | 0.74 | 284 | | 1271 | 45 | 0.379 | | 360 | 3000 | 8.2 |
| B | | 193 | | 7143 | | | | 380 | 2400 | 6.3 |
| C | 1.94 | | | 4545 | | | | 430 | 2400 | 5.7 |
| D | 1.12 | 321 | | 153 | 30 | 0.423 | | 470 | 3000 | 6.3 |
| I | 0.8 | 340 | | 386 | 28 | | 20.8 | 960 | 3100 | 3.2 |
| II | 0.73 | 346 | 4.5 | 696 | 31 | 0.433 | | 1100 | 2800 | 2.5 |
| III | 0.82 | 360 | | 332 | 35 | | | — | — | — |
| IV | 0.83 | 456 | | 64 | 25 | 0.488 | | — | — | — |
| V | 0.98 | 298 | | 57 | 45 | | | 1100 | 3400 | 2.9 |
| VI | 0.92 | 418 | | 38 | 32 | | | 3800 | 1500 | 2.5 |
| VII | 0.90 | 370 | <1.7 | 103 | 38 | | | | | |
| VIII | 0.82 | 362 | 1.9 | 192 | 22 | | | | | |
| IX | 1.04 | 320 | 0.4 | 44 | | 0.469 | | | | |

Test Methods
SEC-MALS:

The molecular mass distributions (Mn, Mw, Mz, Mw/Mn) were measured using a PL-210 Size Exclusion Chromatograph coupled to a refractive index detector (PL) and a multi-angle light scattering (MALS) detector (laser wavelength 690 nm) from Wyatt (type DAWN EOS). Two PL-Mixed A columns were used. 1,2,4-trichlorobenzene was used as the solvent, the flow rate was 0.5 ml/min, and the measuring temperature was 160° C. Data acquisition and calculations were carried out via Wyatt (Astra) software. The UHMWPE should be completely dissolved under such conditions that polymer degradation is prevented by methods known to a person skilled in the art.

Bulk density is determined according to DIN 53466; ISO 60 at 23° C. and 50% relative humidity.

Particle Size and Span:

The average particle size (d50) of the polymer is determined in accordance with ISO 13320-2, using a Malvern™ LLD particle size analyzer. The span defined as (d90−d10)/d50 was also determined using the Malvern™ LLD particle size analyzer.

The average size of the catalyst is determined using a Malvern™ LLD particle size analyzer.

Dry Flow (DF):

The dry flow in seconds was measured according to the method described in ASTM D 1895-69, Method A; 23° C. and 50% relative humidity.

Intrinsic Viscosity (IV):

The Intrinsic Viscosity is determined according to method PTC-179 (Hercules Inc. Rev. Apr. 29, 1982) at 135° C. in decalin, the dissolution time being 16 hours, with BHT (Butylated Hydroxy Toluene) as anti-oxidant in an amount of 2 g/l solution, by extrapolating the viscosity as measured at different concentrations to zero concentration;

Elongational Stress (ES)
of UHMWPE is measured according to ISO 11542-2A.

The invention claimed is:

1. A process for preparing a particulate ultra high molecular weight polyethylene (pUHMWPE), comprising the steps of:
   a) preparing a magnesium containing carrier by interaction of a solution of an organomagnesium compound having composition $MgR^1{}_2 \cdot nMgCl_2 \cdot mR^2{}_2O$ where n=0.37-0.7, m=1.1-3.5, $R^1$ is each an aromatic or aliphatic hydrocarbyl residue and $R^2{}_2O$ is an aliphatic ether, with a chlorinating agent at a molar ratio Mg/Cl of at most 0.5, wherein Mg represents the Mg of the organomagnesium compound and Cl represents the Cl of the chlorinating agent;
   b) loading the magnesium containing carrier with a organometallic compound forming a supported catalyst, and
   c) contacting the supported catalyst with at least ethylene under polymerization conditions, wherein the organometallic compound is a compound of the formula $R^3{}_3P\!=\!N\!-\!TiCpX_n$, wherein each $R^3$ is independently selected from the group consisting of:
   a hydrogen atom,
   a halogen atom,
   a $C_{1-20}$ hydrocarbyl radicals optionally substituted by at least one halogen atom,
   a $C_{1-8}$ alkoxy radical,
   a $C_{6-10}$ aryl or aryloxy radical,
   an amido radical,
   a silyl radical of the formula $-Si-(R^4)_3$ and
   a germanyl radical of the formula $-Ge-(R^4)_3$, and wherein
   each $R^4$ is independently selected from the group consisting of:
   hydrogen,
   a $C_{1-8}$ alkyl or alkoxy radical, $C_{6-10}$ aryl or aryloxy radicals,
   Cp is a cyclopentadienyl ligand,
   X is an activatable ligand and
   n is 1 or 2, depending upon the valence of Ti and the valence of X.

2. The process of claim 1, further comprising the step of treating the magnesium containing carrier or the organometallic compound with an activator selected from the list of alumoxanes, alkyl aluminiums, alkyl aluminum halides, anionic compounds of boron or aluminum, trialkylboron compounds, triarylboron compounds, borates, and mixtures thereof.

3. The process according to claim 1, wherein the magnesium containing carrier has a D50 of 2 to 30 µm.

4. The process according to claim 1, wherein step c) comprises contacting ethylene and at least one alpha-olefin with the supported catalyst.

5. The process according to claim 1, wherein the chlorinating agent is a chlorine-containing compound of composition $Y_kACl_{4-k}$, where $Y=OR^5$ or $R^5$ group with $R^5$ being a $C_{1-20}$ hydrocarbyl radicals optionally substituted by at least one halogen atom, A is a Si or C atom and k=0 to 2.

6. The process according to claim 1, wherein the organometallic compound is of the formula $^tBu_3P\!=\!N\!-\!TiCp^*X_2$, wherein Cp* is pentamethylcyclopentadienyl and X is selected from the group consisting of Cl, Br, Me and Et.

7. The process of claim 1, wherein X is selected from the group consisting of Cl, Br, Me and Et and n=2.

8. The process of claim 1, wherein X is a substituted or unsubstituted butadiene and n=1.

* * * * *